United States Patent [19]

Bich et al.

[11] 4,442,138
[45] Apr. 10, 1984

[54] SUBSTRATE PRETREATMENT WITH A METAL-BETA KETO ESTER COMPLEX IN THE METHOD OF CURING AN ANAEROBIC RESIN

[75] Inventors: George J. Bich, Pittsburgh; Thomas M. Burke, Whitehall; James D. B. Smith, Monroeville, all of Pa.

[73] Assignee: Westinghouse Electric Corp., Pittsburgh, Pa.

[21] Appl. No.: 350,907

[22] Filed: Feb. 22, 1982

[51] Int. Cl.³ .................. B01J 31/12; B05D 3/12; B05D 5/12; D02G 3/00
[52] U.S. Cl. .................. 427/116; 427/118; 427/302; 427/350; 428/377; 428/324; 525/360; 525/370; 502/152
[58] Field of Search .............. 525/370, 360; 252/431 C; 427/393.5, 385.5, 389.9, 340, 342, 322, 323, 324, 326, 302, 118, 294, 296, 116, 350; 156/309, 169; 428/377, 324

[56] References Cited

U.S. PATENT DOCUMENTS

| 3,750,273 | 8/1973 | Beddows | 156/53 X |
|---|---|---|---|
| 3,836,653 | 9/1974 | Weber et al. | 424/244 |
| 3,991,232 | 11/1976 | Kamiuchi et al. | 427/116 |
| 4,081,308 | 3/1978 | Skoultchi | 156/310 |
| 4,117,361 | 9/1978 | Smith et al. | 156/53 X |
| 4,128,527 | 12/1978 | Kinjo et al. | 310/43 X |
| 4,138,385 | 2/1979 | Uffner et al. | 252/431 X |
| 4,160,178 | 7/1979 | Smith et al. | 427/104 X |
| 4,239,802 | 12/1980 | Smith et al. | 428/377 |
| 4,348,498 | 9/1982 | Kamio et al. | 252/431 X |

Primary Examiner—Michael R. Lusignan
Attorney, Agent, or Firm—D. P. Cillo

[57] ABSTRACT

A method of curing an anaerobic resin, which primarily contains acrylic resin, includes externally catalyzing the cure of the resin with a metal-beta keto ester complex having the structural formula:

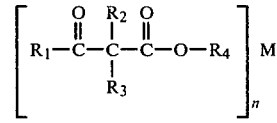

where M is a transition metal; $R_1$ is selected from the group consisting of alkyl groups having from 1 to 20 carbon atoms, benzene, naphthalene, anthracene, and hydrocarbon substituted aromatic; $R_2$ and $R_3$ are selected from hydrogen, alkyl groups having from 1 to 20 carbon atoms, benzene, naphthalene, anthracene and hydrocarbon substituted aromatic; $R_4$ is selected from alkyl groups having from 1 to 20 carbon atoms; and n is equal to the valence of the metal M.

24 Claims, 5 Drawing Figures

SUBSTRATE PRETREATMENT WITH A METAL-BETA KETO ESTER COMPLEX IN THE METHOD OF CURING AN ANAEROBIC RESIN

BACKGROUND OF THE INVENTION

The use of an anaerobic resin in tape insulation for copper electrical coils is taught by J. D. B. Smith et al., in U.S. Pat. Nos. 4,160,178 and 4,239,802. These anaerobic resins, i.e., resins which will not cure in the presence of oxygen, were heretofore vacuum impregnated into uncatalyzed, sheet backed mica tape, which was already wound onto an electrical coil. The anaerobic resin was then cured, without the application of heat, preferably by introduction of a contacting, flowing stream of a selected oxygen free inert gas, such as nitrogen.

While this method of applying and curing anaerobic resins provided deep cured insulation, improvements in storage stability, power factor values, resin drainage, and better utilization of pressurized, static, inert gas cure, would be highly advantageous. A method of easily applying and curing anaerobic resins on the surface of a glass, plastic, or metal base, would also be useful.

SUMMARY OF THE INVENTION

We have found that initially impregnating porous tape insulation, or coating a substrate made of, for example, paper, mica, glass, plastic or metal, with a composition containing an amount of a metal-beta keto ester complex, i.e., metal $\beta$ keto ester complex, effective to catalyze anaerobic resin subsequently applied, improves power factor values and gel times, and allows ease of pressurized, static, inert gas cure. The metal-beta keto ester complex can be utilized in a solvent carrier, or in some instances can be utilized in a resinous carrier.

More specifically, in the case of impregnating a standard, resin bonded mica flake insulating tape wound on an electrical coil, as an initial step, in one embodiment of the method of this invention, the coil would be vacuum impregnated with a solvent solution of a metal-beta keto ester complex, such as, preferably, copper ethylacetoacetate, as a pretreatment step. The coil would be dried and then vacuum impregnated with an anaerobic resin. Alternatively, the bonding resin used in the mica tape could be of an acrylic based anaerobic type, and include a metal-beta keto ester complex, such inclusion in the bonding resin would still be considered a pretreatment of the mica tape.

Thus the metal-beta keto ester complex is applied as part of a composition, where the carrier of the composition is a suitable solvent or a resin. The preferred anaerobic resin, used either as the mica bonding resin or as the final insulation, would contain at least one polyacrylic resin, such as neopentyl glycol diacrylate, tetraethylene glycol diacrylate and the like, and may contain minor amounts of initiators, such as cumene hydroperoxide; accelerators, such as triphenyl amine; coaccelerators; and stabilizers, such as hydroquinone. It is to be understood, that the term "anaerobic resin" is meant to include such minor amounts of initiators, accelerators, coaccelerators, stabilizers, and the like. Epoxy resins, along with optional associated anhydride or other curing agents and latent accelerators could also be added to the anaerobic resin.

After vacuum impregnation with anaerobic resin and draining, the coil would be placed in a sealed tank, purged with a nitrogen stream and then pressurized with nitrogen at about 40 psig. After about 16 hours the anaerobic insulation would be completely cured by the nitrogen gas and the coil could be removed.

By utilizing a metal-beta keto ester complex as an anaerobic resin catalyst in the porous tape insulation, or on the substrate to be coated, very high concentrations of the complex can be used, causing rapid gelation and complete cure of the anaerobic resin. In addition, very long resin storage lifetimes result, because the catalyst is external to the main portion of the insulating resin. The metal-beta keto ester complex is effective in providing outstanding gelation and cure, providing a very hard resin that resists debilitation upon aging. The metal-beta keto ester complex is capable of dissolution in suitable solvents to allow substrate pretreatment, with the ability of not leaching into the anaerobic resin during vacuum impregnation. Other materials, such as metal acetates and metal acetylacetonates are much less effective to pretreat substrates in the manner described above.

BRIEF DESCRIPTION OF THE DRAWINGS

For a better understanding of the invention, reference may be made to the exemplary embodiments shown in the accompanying drawings, in which.

DESCRIPTION OF THE PREFERRED EMBODIMENTS

Figure 1:
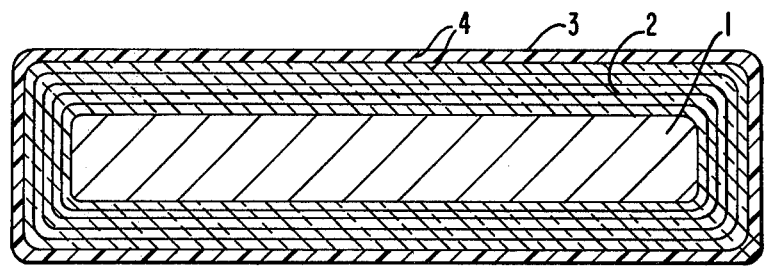
FIG. 1 is a cross-sectional view of an insulated conductor impregnated with anaerobic resin.

Referring to FIG. 1 of the Drawings in order to better understand the invention, a copper or aluminum conductor 1, is shown. The conductor is wound with a plurality of layers of mica tape or other type of insulation 2 and one layer of woven tape insulation 3, which helps hold the insulation 2 in place. The insulation 2 can, for example, consist of mica paper or mica flakes or splittings bonded to a sheet backing of cellulose paper, cotton cloth, woven glass cloth, or the like, i.e., mica tape, by an effective amount of bonding resin, that can itself be an anaerobic resin or that is compatible with anaerobic resin 4, which impregnates the insulation. The metal-beta keto ester complex used in this invention can be applied to the wound conductor prior to final anaerobic resin application, or it can be used in the bonding resin which adheres the mica to its sheet backing. Where it is used as a component of the bonding resin, it will still have the capability of intermixing and migrating to the subsequently applied anaerobic resin to provide a catalytic effect on the anaerobic resin.

Figure 2:
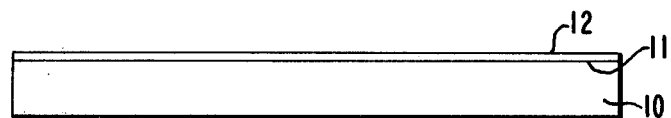
FIG. 2 is a cross-sectional view of an article having anaerobic resin applied thereto.
Figure 5:
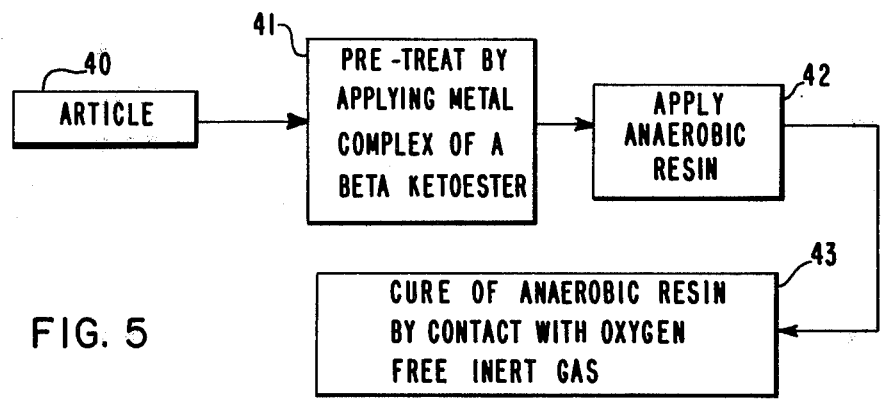
FIG. 5 is a schematic diagram describing one embodiment of the method of this invention.

FIG. 2 of the Drawings shows a flat substrate 10, which can be a plastic, such as polycarbonate, polymethyl methacrylate or the like; metal, such as copper, brass, aluminum or plated steel; glass; wood; a decorative or industrial laminate such as phenolic, polyester or epoxy resin impregnated glass cloth, cotton cloth or cellulose paper; mica tape insulation; cellulose paper; cotton cloth; woven glass cloth; and the like, covered and/or impregnated on side 11 with an anaerobic resin insulating and/or protective and/or adhesive film 12. The film 12 may also cover the other side 13 or completely encapsulate the substrate 10. The film 12 may serve as an adhesive bond for a similar flat article disposed on the top of flat substrate 10, i.e., a composite or laminate of two flat sheets. The substrate 10 can be of a variety of shapes. The metal-beta keto ester complex of this invention can be applied to the side 11 prior to application of anaerobic resin 12.

The anaerobic resin used in this invention is a resin which will not cure in the presence of oxygen dissolved therein. However, it is capable of gas penetration, and will deep cure, in the method of this invention, at room temperature, when placed in an oxygen free environment containing a gas effective to displace the dissolved oxygen. By "deep cure" is meant, curing to a solid state to depths of about 6 inches.

The anaerobic insulating resins used in the method of this invention will preferably contain aliphatic polyacrylics such as diacrylate and triacrylate resins, which polymerize by addition through a double bond. Commonly used polyacrylic resins include neopentyl glycol diacrylate and tetraethylene glycol diacrylate. The anaerobic insulating resin may also contain aliphatic monoacrylic resins such as ethyl methacrylate and aromatic, reactive vinyl monomers such as styrene. Well known organic initiators, such as cumene hydroperoxide are used to help initiate cure. Small effective amounts of well known, organic accelerators, usually tertiary amines such as N,N-dimethyl-p-toluidine, and a small effective amount of organic coaccelerator, usually an organic sulfimide such as benzoic sulfimide, may be present to reduce curing time. The initiator is stabilized with a stabilizer such as hydroquinone. A variety of epoxy resins may be used in this invention to provide improved electrical, curing, shrinkage and high temperature stability properties.

Although the chemistry of the anaerobic resins used in the method of this invention is very complex, and not completely understood even at this time, it is believed that the unique curing characteristic of the material of this invention is linked to the tendency for the organic peroxide initiator, i.e., hydroperoxide or perester, to be stabilized in an oxygen-rich atmosphere, or by dissolved oxygen in the resin itself:

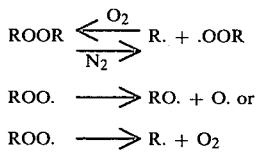

$$ROO. \longrightarrow RO. + O. \text{ or}$$

$$ROO. \longrightarrow R. + O_2$$

An equilibrium is attained between the organic peroxide free radical initiator and its decomposition products in an air or an oxygen-containing environment. Presumably, the small amount of free radicals produced under these conditions are "quenched" or stabilized by organic reaction inhibitors such as hydroquinone. However, when the equilibrium is moved to the right, i.e., by decreasing the oxygen content, such as displacement by $N_2$, the concentration of free radicals will increase sharply and the inhibitor is no longer able to quench all of them.

At some critical point, the peroxide radicals or their by-products will begin to initiate polymerization. The function of accelerators or coaccelerators would be to speed up the rate of decomposition of the organic peroxide, thereby giving a faster gelation time for the impregnants. The gaseous atmosphere, such as nitrogen, functions as a resin permeable cure initiator.

The anaerobic resins used in this invention contain a variety of components which allow a chain reaction mechanism to proceed, resulting in deep resin cure. Without using heat, reaction kinetics and component interaction are of prime importance in cure. All resin systems contain small quantities of dissolved $O_2$, due to $O_2$ permeation from the atmosphere i.e., about 1.0 to 10 volume %. A normal vacuum of about 3 to 5 mm. of Hg will not remove this $O_2$ to a level of below about 0.5 volume %, which is required in the method of this invention. A vacuum of below 1 mm. of Hg might remove the dissolved $O_2$ but would also probably eliminate some required reactive species, and is commercially unfeasible.

Suitable diffusion gases, i.e., gases that are soluble in the resin and effective to permeate the resin and displace substantially all of the dissolved $O_2$ therein, are preferably, argon, helium, carbon dioxide, methane, hydrogen, and most preferably nitrogen. By "displace" is meant removal of oxygen to a level below about 0.5 volume % i.e., below 0.5 volume % $O_2$. Below this amount, the chain reaction cure will proceed between the combination of ingredients in the resin. Argon, helium and carbon dioxide are the most effective to displace $O_2$, but nitrogen is preferred because it is commercially available in pure form free of moisture. Of course, other gases or gas mixtures effective to act as defined above can be used. It is also possible that these diffusion gases might in some way interact with some components of the resin formulation to push the reaction to polymerization.

It is thought that there is a complex interaction between all of the components present in the anaerobic resins described herein. The free radical initiator must be present in an amount effective to initiate acrylic or vinyl monomer cross linking or polymerization. The accelerator must be present in an amount effective to activate the peroxide to form a complex. The coaccelerator must be present in an amount effective to cause decomposition of the peroxide free radical initiator, and the reaction inhibitor must be present in an amount effective to prevent peroxide decomposition when $O_2$ is present in the resin.

However, a major problem in past systems has been the requirement of limiting the amount of accelerator and coaccelerator used in the anaerobic resin mixture, because excessive amounts of these ingredients drastically cut down the pot life of the resin to below about 3 weeks. Since commercial utilization of anaerobic resins for coil insulation impregnation requires large quantities of the resin in a dipping and vacuum impregnation step, storage stability of the resin is a very important consideration, and should last over about 8 weeks at ambient temperatures.

This invention pretreats the article to be impregnated or coated, with a composition containing a metal complex of a beta keto ester, which, when the keto ester is added in an effective amount, acts as a catalyst for the anaerobic resin upon contact. This pretreatment accomplishes a result similar to drastically increasing the accelerator and coaccelerator content of the anaerobic resin, i.e., dramatically increasing gel time of the anaerobic resin, and substantially lowering resin loss through drainage, without, however, decreasing the pot life of the anaerobic resin. Use of this pretreatment also increases resin pick up, allows complete cure without heating, and importantly, provides a very hard resin that resists debilitation upon aging. Power factor values of anaerobic resins cured in conjunction with the pretreatment of this invention are shown to be outstanding. Only a very small class of compounds are effective, however, to pretreat the substrate and accomplish the above described results.

As an initial step, the article to which an anaerobic resin is to be applied is painted, dipped, sprayed, or if porous, preferably vacuum impregnated with a concentrated amount of a metal-beta keto ester complex, preferably a metal alkylacetoacetate. An effective amount of the metal-beta keto ester complex to be in contact with an anaerobic resin, is a concentration of between about 10 mg. to about 1,000 mg. per liter of suitable solvent applied to the article, preferably between about 100 mg. to about 450 mg. per liter of suitable solvent. Below 10 mg. per liter and little catalytic effect on the contacting anaerobic resin is evidenced. Over 1,000 mg. per liter and leaching back into the impregnating or coating dip solution is probable. Suitable solvents include acetone, methylene chloride, toluol, and the like. Thus, the composition containing the metal-beta keto ester complex will coat and/or be carried into the interstices of the article to be coated or impregnated with anaerobic resin, and will be present in major amounts to contact the anaerobic resin and catalyze the anaerobic resin cure mechanism.

As an alternative, the metal-beta keto ester complex may be included in the resin initially used as a first impregnant or bonding resin for the article, when the article is, for example, a mica tape or glass cloth. In this case an effective amount of metal-beta keto ester complex to be in contact with an anaerobic resin is a concentration of between about 10 mg. to about 1,000 mg., preferably between about 150 mg. to about 450 mg. per liter of suitable resin for the article; where the metal-beta keto ester complex solution is admixed with the bonding resin, in a weight ratio of (metal-beta keto ester complex):(bonding resin) of between about (0.5 to 2):(10), said resin preferably having an acrylic base.

The useful metal-beta keto ester complex, has the following structural formula:

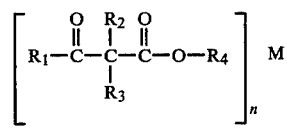

(metal complex of a β keto ester), where M is a transition metal such as titanium, vanadium, chromium, manganese, iron, cobalt, nickel, zinc, and preferably copper. $R_1$ is selected from alkyl groups having from 1 to 20 carbon atoms, preferably 1 to 4 carbon atoms, benzene, naphthalene, anthracene and hydrocarbon substituted aromatic; $R_2$ and $R_3$ are selected from hydrogen, alkyl groups having from 1 to 20 carbon atoms, preferably 1 to 4 carbon atoms, benzene, naphthalene, anthracene and hydrocarbon substituted aromatic; and $R_4$ is selected from alkyl groups having from 1 to 20 carbon atoms, preferably 1 to 4 carbon atoms. In the formula, n is equal to the valence of the metal used in the complex. The term "hydrocarbon substituted aromatic" is meant to include for example aralkyl groups, such as

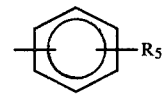

where $R_5$ is selected from alkyl groups having from 1 to 10 carbon atoms.

The preferred catalyst, copper ethylacetoacetate has the following structural formula:

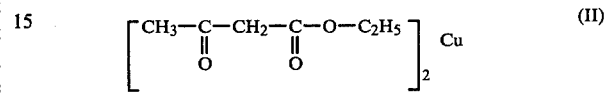

In structures (I) and (II), the metal in the complex is "bonded" to two and possibly three oxygen atoms. The key to catalytic activity is thought to be the —O—$R_4$ group, which is though to act as an electron donor for the diketo group. Metal acetates on the other hand are strictly ionic, and metal acetylacetonates do not contain any oxygen bonding the $R_4$ radical to the diketo part of the molecular structure.

The metal complex of a beta keto ester appears to be unique in its ability to dissolve in a suitable solvent, to remain on or in the article after pretreatment, to not leach back out into the anaerobic resin bath so that the bath retains its lengthy pot life, and to effect rapid gelation and very hard cure of the anaerobic resin. Other compounds, such as copper acetate, cobalt acetate, manganese acetate, copper acetylacetonate, cobalt acetylacetonate and manganese acetylacetonate are not effective in reducing the gel time and preventing resin loss through drainage, apparently having little or no catalytic effect on the anaerobic resin.

The component $R_4$ in structure (I) above, attached to the ester oxygen, appears to play some part in the catalytic effect which is not understood at this time. While not wanting to be held to any particular theory, the $R_4$ component is thought to be an electron donor to both the attached keto oxygen, and to the ester oxygen, thereby increasing their nucleophilic (electron density) nature. This may cause the transition complex thought to be formed between the metal complex beta keto ester and the peroxide initiator to be more reactive, and promote a catalytic effect on the anaerobic resin polymerization rate. The —O—$R_4$ group also appears to increase the solubility of the compound in a wide range of solvents.

The solventless anaerobic resins used to coat or impregnate articles according to this invention have extremely useful and widespread applications. One of the obvious advantages of this pretreatment-anaerobic coating or impregnation method is that these resins would not require any heat treatment to completely gel. This would offer the possibility of eliminating baking ovens in the curing method thereby reducing capital expenditures and saving valuable floor space in manufacturing plants. Also, heat energy and hence fuel costs would be drastically curtailed.

Other notable advantages of this method would be lower resin "run-off" from coils and stators, reduced air pollution arising from volatile substances in the curing oven, and the elimination of damaging mechanical stresses sometimes found in the manufacture of larger coils and stators, from copper expansion effects during the heat treatment of resins. On some articles, the reduction of "run off" would mean more uniform resin coverage, rather then coverage at the top of the article, where drainage has caused a high bottom resin concentration.

The acrylic and acrylic-epoxy anaerobic resins of this invention can be formulated to have viscosities as low as 1 cps., making them uniquely applicable for coating and impregnation of multiple layered mica insulated high voltage coils. These resins can also be formulated for use as wire enamel resins. These acrylic and acrylic-epoxy anaerobic resins can also find particularly useful application as insulating potting resins for transformers and insulating casting resins for bushings which may be used in power circuit breakers, since they can be deep cured to 6 or more inches without requiring heat. Following cure by the static, pressurized, or flowing diffusion gas, the resins can be optionally post-cured in an oven for up to 48 hours at 100° C. to 175° C. In most instances the electrical properties of the diffusion gas cured resins are more than adequate, and post-curing is not necessary, due to inert gas contact in a manner effective to displace oxygen dissolved in the resin, causing cure initiation.

The anaerobic resin will hereinafter be discussed primarily for use in an impregnating process, but it is to be understood that its use is not so limited. Referring again to FIG. 1 of the Drawings, the conductor 1 is preferably copper because it is most widely used conductor for electrical insulation although other metals can also be used. The primary insulation is preferably mica, especially for high voltages, as it has excellent electrical properties. Glass, polyester, Nomex, a polyamide believed to be made from meta phenylene diamine and isophtaloyl chloride, and other types of insulation could also be used, either alone, in mixtures, or in mixtures with mica.

Mica insulation is usually made with a polyester fabric backing to hold the mica together. The insulation may be a tape which is wrapped around the conductor, the amount of insulation depending upon the voltage drop across the insulation. The mica is preferably coated with about 3% to 30%, preferably about 5% to about 12%, by weight based on the mica insulation weight, of a separate bonding resin which is compatible and co-reactive with the impregnated anaerobic resin, in order to insure a better bond between the mica and between the mica and the fabric backing. Such bonding resins include polyesters, polybutadienes, acrylic based resins also having anaerobic cure properties, and the like.

The anaerobic resin used in this invention is an admixture comprising (acrylic resin):(aromatic reactive vinyl monomer):(epoxy resin):(anhydride) in a weight ratio of from about (10):(0 to 120):(0 to 100):(0 to 60). This resin also contains, for 100 parts by weight of total resin: 0.001 to 10 parts initiator, 0.01 to 10 parts accelerator, 0.01 to 10 parts coaccelerator, and 0.001 to 1 part free radical stabilizer. The acrylic resin will preferably contain a ratio of (aliphatic, poly, i.e., di, tri, or tetra acrylic resin):(monoacrylic resin) of from, about (10):(0 to 20), however the acrylic component can contain all monoacrylic resin.

Polyacrylic resins that are useful and preferred in the insulating resin of this invention are selected from the group of aliphatic, organic diacrylates such as, for example, tetraethylene glycol dimethacrylate, tetraethylene glycol diacrylate, hexamethylene glycol dimethacrylate, neopentyl glycol diacrylate, neopentyl glycol dimethacrylate, hexamethylene glycol diacrylate, ethylene glycol dimethacrylate, trimethylene glycol diacrylate, bisphenol A dimethacrylate, ethoxylate bisphenol A diacrylate, and the like; aliphatic, organic triacrylates such as, for example, trimethylol propane triacrylate, and the like; and aliphatic, organic tetracrylates such as pentaerythritol tetracrylate, and the like; and their mixtures. The preferred acrylic resins are tetraethylene glycol diacrylate and neopentyl glycol diacrylate.

Aliphatic or cyclic, monoacrylic resins, and aromatic, reactive vinyl monomers can be used with the preferred polyacrylics. Those particularly useful are, for example, organic aliphatic monoacrylates, such as ethyl acrylate, 2-ethyl acrylate, 2-ethylhexyl acrylate, ethyl methacrylate, glycidyl methacrylate, allylmethacrylate, and the like; cyclic monoacrylic resins, such as cyclohexyl methacrylate, and the like; vinyl acids such as acrylic acid, methacrylic acid and the like; and organic, aromatic, reactive vinyl monomers, such as vinyl pyridine, vinyl toluene, tertiary butyl styrene, styrene, and the like. The preferred monoacrylics and reactive vinyl monomers are ethyl methacrylate, 2-ethylhexyl acrylate and styrene. These materials act as reactants and diluents for the preferred polyacrylics and optional epoxy resin.

The epoxy resins that can be used as a component of the anaerobic resins used in this invention, include diglycidyl ethers of bisphenol A, diglycidyl ethers of bisphenol F, polyglycidylethers of a novolac, glycidyl ester epoxy resins, hydantoin epoxy resins, cycloaliphatic epoxy resins, diglycidyl ethers of an aliphatic diol having from 2 to 12 carbon atoms, and mixtures thereof.

All of the above described epoxy resins can be characterized by reference to their epoxy equivalent weight, which is defined as the mean molecular weight of the particular resin divided by the mean number of epoxy radicals per molecule. In the formulations used in the invention, all of the suitable epoxy resins will have a preferred epoxy equivalent weight of from about 100 to about 500, with a most preferred range of about 150 to about 250. All of these epoxy resins are well known in the art, and are described in detail, for example, in U.S. Pat. No. 4,160,178, herein incorporated by reference.

In many instances, organic, carboxylic acid anhydrides reactive with the epoxy, are used in the resin formulation. These anhydrides include the conventional organic mono- and poly-functional anhydrides. Typical of the mono-functional anhydrides are hexahydrophthalic anhydride, 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride and the like. Poly-functional anhydrides which may be employed include pyromellitic dianhydride, polyazelaic polyanhydride, the reaction product of trimellitic anhydride and an organic glycol, and benzophenone tetracarboxylic acid dianhydride. These organic anhydrides may be used singly or in admixture.

In some instances, latent accelerators may also be used for improving the electrical properties of the anaerobic resins. These latent accelerators are well known in the epoxy resin curing art, and a number of them are described in U.S. Pat. Nos. 3,868,613, 4,020,017, and 4,254,351, herein incorporated by reference. They include organic quaternary ammonium salts, organic quaternary phosphonium salts, quaternary organo-tin compounds, and metal acetylacetonates, among others. Examples of some useful latent accelerators would include, for example, trimethyl ammonium chloride, methyltrioctyl phosphonium dimethyl phosphate, triphenyl tin acetate, chromium acetylacetonate, manganese acetylacetonate, and the like. They are well known in the art, and can be used between 0.001 to 2 parts per 100 parts total resin.

Free radical initiators particularly useful in the resin formulations used in this invention are, preferably, effective amounts of 2,2'-azobis (2-methyl propionitrile), or organic peroxides, such as, for example, cumene hydroperoxide, t-butyl perbenzoate, t-butyl hydroperoxide, benzoyl peroxide, 2,5-dimethyl-2,5 bis (benzoylperoxy) hexane, and the like. They are well known in the art, and can be used between 0.001 to 10 parts per 100 parts total acrylate+aromatic vinyl monomer-+epoxy+anhydride i.e., per 100 parts total resin.

Free radical reaction accelerators, used to initiate cure, which are particularly useful under the cure conditions of this invention are, preferably, organic amides and amines, such as, for example N,N'-diethylformamide, N,N-dimethyl-p-toluidine, N,N-diethyl-p-toluidine, triphenylamine, and the like. They are well known in the art, and can be used between 0.01 to 10 parts per 100 parts total resin. Organic elastomeric accelerators, such as mercapto benzothiazole, and the like are also useful, in the same amounts as above, in some instances.

Free radical reaction coaccelerators, used to reduce curing time, which are particularly useful under the cure conditions of this invention are, preferably, organic sulfimides, such as, for example, benzoic sulfimide, and the like. They are well known in the art, and can be used between 0.01 to 10 parts per 100 parts total resin.

Free radical stabilizers, used to stabilize the initiator, particularly useful in the resin used in this invention, are effective amounts of organic reaction inhibitors such as, for example, hydroquinone, parabenzoquinone, acidic compounds such as di-nitrophenols, trinitrophenols, picric acid, cresylic acid, and the like. They are well known in the art, and can be used between 0.001 to 1 part per 100 parts total resin.

The vacuum pressure impregnation process is a preferred method of insulating a wrapped conductor, because it leaves very few air gaps in the insulation. In this process, the pretreated mica tape wrapped conductor is placed in a tank or other type pressure container which is then evacuated to remove oxygen. The anaerobic resin is admitted under pressure, usually at least about 45 psi., although about 90 psi. to about 100 psi. is preferred. The resin should saturate the insulation. Typically, the insulation will contain about 5% to about 35%, by weight based on the insulation weight, of the resin, although about 20% to about 30% is preferred. The resin is then permitted to drain from the wrapped conductor.

The resin impregnated insulation then is cured by contact with a gas which does not contain any significant amount of oxygen. This may be accomplished in the same tank, or the wrapped conductor may be cured in a separate tank. Oxygen is again evacuated from the tank and the inert gas is fed into the tank at 25° C. Nitrogen, or carbon dioxide, or mixtures of these two gases are preferred as they are inexpensive, safe, and easy to handle, but other inert gases may also be used, such as argon, helium, methane or hydrogen. It has been found that if nitrogen or carbon dioxide are used, the rates of cure are optimum at a continuous inert gas stream flow of about 6 lpm to about 20 lpm (liters per minute). Instead of a gas flow across the insulation, a 20 psi. to 200 psi. static gas pressure can be maintained in a closed tank to cure the resin. Times involved in either instance are from about 4 to 24 hours for complete cure.

Figure 3:
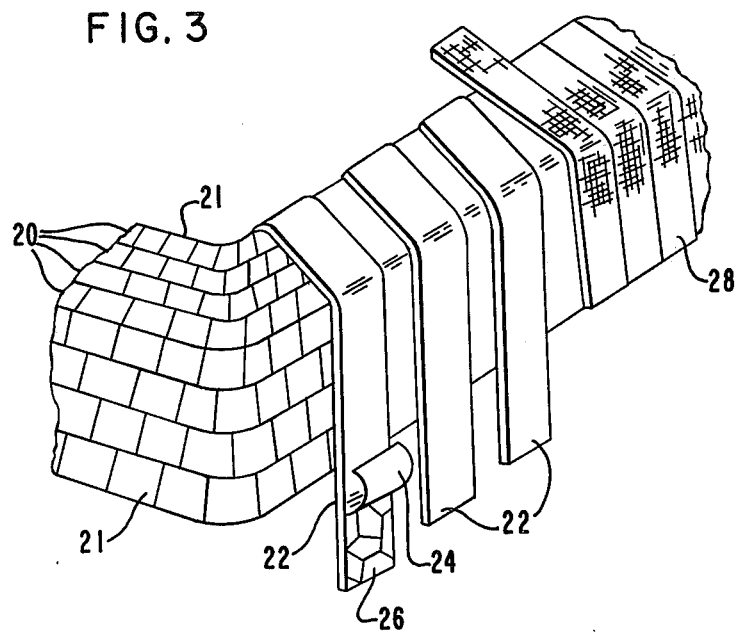
FIG. 3 is a fragmentary view in perspective showing part of a copper electrical coil comprising a plurality of conductors wound with mica tape insulation impregnated with anaerobic resin.

Referring now to FIG. 3 of the Drawings, there is illustrated a coil suitable for use in high-voltage electric motors and generators. The full coil would be disposed within the slots of the metal stator surrounding the metal motor armature or generator rotor and could also be used in the armature and rotor slots. The coil comprises a plurality of turns of conductors 20. Each turn of the conductor 20 consists essentially of a copper bar or wire wrapped with insulation 21, such as glass fiber cloth, paper, mica paper, or aramid paper.

The turn insulation is not adequate to withstand the severe voltage gradients that will be present between the conductor and ground when the coil is installed in a high-voltage electrical machine. Therefore, ground insulation for the coil is provided by wrapping plural layers of composite mica tape 22 about the turn 20. Such composite tape 22 can comprise a pliable backing sheet 24 of, for example, polyethylene terephthalate mat, having a layer of mica flakes 26 bonded thereto. The mica tape can have metal-beta keto ester complex therein as part of the bonding resin or can have metal-beta keto ester complex deposited from solution on and into the resin bonded mica.

The tape may be applied half lapped, abutted or otherwise. Generally, a plurality of layers of the composite tape 22 are wrapped about the coil, with sixteen or more layers generally being used for high voltage coils. In such instances, anaerobic resins are particularly useful, since they can be formulated with viscosities as low as 1 cps. and can be deep cured. To impart better abrasion resistance and to secure a tighter insulation, a wrapping of an outer tape 28 of a tough fibrous material, for example, glass fiber or the like may be applied to the coil.

The mica tape 22 for insulating the coils shown in FIG. 3 may be prepared from a sheet backing support material upon which is disposed a layer of mica in the form of integrated flake paper, flakes, splittings, or very fine particle size mica paper. The sheet backing and the mica are contacted and impregnated with the anaerobic resinous impregnant. This mica insulation is preferably in the form of a tape of the order of one-half inch to two inches in width, though sheet insulation of any other width may be prepared.

For building electrical machines, such as motors and generators, the sheet backing 24 for the mica may comprise cellulose paper, cotton fabric, linen fabric, woven glass cloth, glass fibers, mats or fabrics prepared from nylon, polyester, polyethylene, linear polyethylene terephthalate, polyamide, and aramid fiber, or additional mica paper sheets. Sheet backing material of a thickness of approximately 1 mil (0.001 in.), to which there has been applied a layer of from 3 mils to 10 mils thickness of mica has been successfully employed.

Mica flakes are generally about 1/16 inch to ¾ inch square while mica splittings are generally about ¾ inch to 3 inches square. Integrated mica flake paper is made of compacted mica particles about 1/32 inch to ½ inch square, and fine mica paper is made of compacted mica particles about 1/64 inch to 1/16 inch square.

The mica tape is wrapped around the coil and then is impregnated with the anaerobic resin in a vacuum so that there is complete saturation between mica layers. Then, an inert gas is introduced and forced to contact the anaerobic resin, which upon continued exposure to the penetrating non-oxygen containing atmosphere, will deep cure to provide a thermally stable, tough, cured insulation in the thermoset state. The same pressure container used for impregnation can be used to flow the inert gas or introduce it under 20 psi. to 200 psi. pressure.

Figure 4:
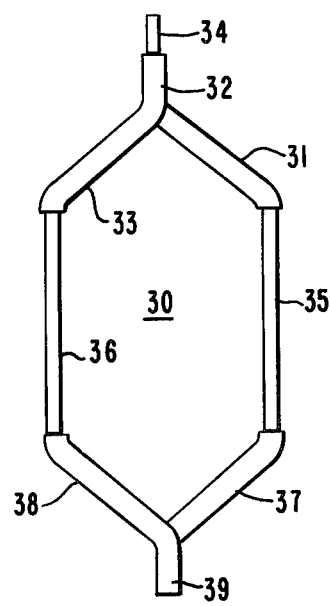
FIG. 4 is a plan view of a closed full electrical coil member.

A closed full coil 30 is shown in FIG. 4 of the Drawings. It comprises an end portion comprising a tangent 31, a connecting loop 32 and another tangent 33 with bare leads 34 extending therefrom. Slot portions 35 and 36 of the coil, which sometimes are hot pressed to form them to predetermined shape and size are connected to the tangents 31 and 33 respectively. These slot portions are connected to other tangents 37 and 38 connected through another loop 39.

The acrylic or acrylic-epoxy resins of this invention are useful as insulation in motor armature and stator coils as well as stator coils and rotor field windings in generators. The acrylic or acrylic-epoxy resins of this invention are also particularly useful for encapsulating large electrical apparatus such as transformers, since they are highly fluid, having viscosities at 25° C. of between about 1 cps. and about 2,000 cps. Over 2,000 cps. and it would be difficult to impregnate thick mica windings. After encapsulation, the resin can be exposed to a gas effective to deep cure the resin. Thus, run-off of resin from coils can be minimized, to yield insulation having good electrical, shrinkage and thermal stability properties. The anaerobic resin can also contain up to about 100 parts of filler particles, such as alumina, alumina trihydrate, silica and the like, of average particle sizes of from about 10 microns to about 300 microns, per 100 parts of total resin.

The electrical properties of the anaerobic resins described hereinabove can be further improved by post-curing for up to about 48 hours at temperatures of up to about 175° C. This is an optional step that may be utilized when the end use is a high voltage application. The method of this invention is shown in diagram form is FIG. 4 of the Drawings, where article 40, be it a mica insulated coil or a polycarbonate sheet, is pretreated by pretreatment means 41, to apply metal alkylacetoacetate. Anaerobic resin is then applied by resin application means 42, after which the anaerobic resin is cured by an oxygen free inert gas in contact means 43.

EXAMPLE 1

Six aluminum rods, 6 inches long and ½ inch in diameter, were ½ lap wrapped with three layers of glass cloth. Four of the glass covered rods were dipped at 25° C. in a pretreatment bath of copper ethylacetoacetate (CuEA) for 5 minutes. The bath contained 100 mg. of copper ethylacetoacetate per liter of acetone solvent. After dipping the impregnated rods were air dried at 25° C. Two glass covered rods were not pretreated with copper ethylacetoacetate.

Two anerobic resin compositions were prepared. Composition 1 consisted of: 375 grams of tetraethylene glycol diacrylate; 125 grams of styrene; 10 grams of cumene hydroperoxide initiator; 0.75 gram of N,N'-dimethyl-p-toluidine accelerator; 2.0 grams of benzoic sulfimide coaccelerator; and 0.4 gram of hydroquinone inhibitor. This provided an anaerobic resin having a weight ratio of acrylic resin:aromatic reactive vinyl monomer of 10:3.3. The parts additives per 100 parts resin (acrylic+styrene) were: 2.0 parts total organic free radical initiator; 0.15 part organic free radical accelerator; 0.40 part organic coaccelerator; and 0.08 part free radical stabilizer. The viscosity of the resin was about 75 cps at 25° C. This provided a relatively simple, two component anaerobic resin composition.

Composition 2 anaerobic resin consisted of: 175 grams of neopentyl glycol diacrylate; 175 grams of tetraethylene glycol diacrylate; 50 grams of trimethylol propane triacrylate; 25 grams of ethylmethacrylate; 50 grams of styrene; 25 grams of a liquid diglycidyl ether of bisphenol A epoxy resin having a viscosity at 25° C. of about 8,000 to 10,000 cps. (sold commercially by Dow Chemical Co. under the tradename DER 828); 10 grams of cumene hydroperoxide initiator; 0.75 gram of N,N'-dimethyl-p-toluidine accelerator; 2.0 grams of benzoic sulfimide coaccelerator; and 0.4 gram of hydroquinone inhibitor. This provided an acrylic:-styrene:epoxy anaerobic resin. The anaerobic resin had 425 grams total acrylic resin, where the weight ratio of polyacrylic resin:monoacrylic resin was 400:25 or 10:0.62. The weight ratio of acrylic resin:aromatic reactive vinyl monomer:epoxy, resin was 10:1.2:0.6. The parts additive per 100 parts resin (acrylic+styrene+epoxy) were: 2.0 parts total organic free radical initiator; 0.15 part organic free radical accelerator; 0.40 part organic coaccelerator; and 0.08 part free radical stabilizer. The viscosity of the resin was about 100 cps., at 25° C.

Two of the copper ethylacetoacetate pretreated rods, Samples (1) and (2) and one of the untreated rods, Sample (3), were immersed in a pressure vessel containing a bath of Composition 1 anaerobic resin; and two of the copper ethylacetoacetate pretreated rods, Samples (4) and (5), and one of the untreated rods, Sample (6), were immersed in another pressure vessel containing a bath of Composition 2 anaerobic resin. In both cases the vessel was evacuated for 20 minutes. All the rods were then removed from the anaerobic resin, allowed to drain for ½ minute while standing in an upright position, during which time some resin drained off, and then Samples (1), (3), (4) and (6) were placed in a pressure vessel. The pressure vessel was then sealed, purged with oxygen free nitrogen gas for 15 minutes, at a flow rate of about 15 liters/minute, and then pressurized with the oxygen-free nitrogen gas to 45 psig., for 24 hours at about 25° C., to displace substantially all oxygen. The nitrogen treated rods were then removed from the pressure vessel. Measurements for resin pickup and drainoff are shown below in Table I:

TABLE I

| Sample | Initial Resin Pick-Up | Resin Run-Off ½ min. drain | Final Resin Pick-Up | Observations 24 hr. N$_2$ cure |
| --- | --- | --- | --- | --- |
| (1) CuEA+ Comp. 1 | 7.02 g. | 0.53 g. | 6.49 | Resin hard. Evenly completely cured. No odor of acrylate. |
| (3)* Comp. 1 | 7.11 g. | 0.83 g. | 6.28 | Resin hard. Thin on top and heavy on bottom. Some odor. |
| (4) CuEA+ Comp. 2 | 7.21 g. | 0.77 g. | 6.44 | Resin hard. Evenly completely |

TABLE I-continued

| Sample | Initial Resin Pick-Up | Resin Run-Off ½ min. drain | Final Resin Pick-Up | Observations 24 hr. N₂ cure |
|---|---|---|---|---|
| | | | | cured. No odor of acrylate. |
| (6)* Comp. 2 | 6.19 g. | 1.21 g. | 5.98 | Resin hard. Thin on top and heavy on bottom. Some odor. |

*Comparative Samples: no copper ethylacetoacetate pretreatment.

No leach out of copper ethylacetoacetate into the resin bath was apparent. Sample (2), containing CuEA+-Comp. 1, and Sample (5), containing CuEA+Comp. 2, were not nitrogen cured and failed to gel in air over a 10 day period, showing that Compositions 1 and 2 were anaerobic and were cure inhibited by air.

As can be seen from Table I, the copper ethylacetoacetate pretreated and nitrogen cured rods, Samples (1) and (4), exhibited greater final resin pickup and less resin runoff: for resin Composition 1, Sample (1) had 7.5% resin drain, while comparative Sample (3) had 11.7% resin drain. For resin Composition 2, Sample (4) had 10.6% resin drain, while comparative Sample (6) had 19.6% resin drain. The final results show a substantial increase in resin content for the glass cloth wrapped rod, for both Composition 1 and 2 anaerobic resins, by pretreating with a metal-beta keto ester complex prior to impregnation with the anaerobic resin. This pretreatment allows even resin distribution upon cure, as in Samples (1) and (4), rather than thin resin coverage at the top of the rod and heavy resin coverage at the bottom of the rod, due to heavy drainage, as in comparative Samples (3) and (6). Additionally, pretreatment with the metal-beta keto ester complex eliminates heat energy requirements, reduces volatiles, and lowers air pollution.

EXAMPLE 2

Two, 24 inch long, 4.16 kV. stator coils, Samples (7) and (8), similar to those shown in FIG. 3 and FIG. 4 of the drawings, were each separately immersed, as a pretreatment step, in a pressure vessel containing a bath solution of copper ethylacetoacetate (CuEA). The coils were wrapped with mica splitting tape comprising polyester bonding resin and polyethylene terephthalate fabric backing. The copper ethylacetoacetate concentration was 200 mg. per liter of acetone solvent, and the bath temperature was about 25° C.

Each coil was evacuated for 20 minutes in the copper ethylacetoacetate solution, for complete impregnation. Each coil, impregnated with the copper ethylacetoacetate solution was then immediately placed in a separate pressure vessel and evacuated for 30 minutes until dry. Each coil, impregnated with copper ethylacetoacetate was next immersed in a pressure vessel containing a bath of anaerobic resin and evacuated for 30 minutes. Each coil was then removed from the anaerobic resin bath, allowed to drain for ½ minute, during which time some resin drained off, and then placed in a separate pressure vessel.

The pressure vessel was then sealed, purged with oxygen free nitrogen gas for 60 minutes at a flow rate of about 15 liters/minute, and then pressurized with the oxygen-free nitrogen gas to 40 psig. for 16 hours at about 25° C., to displace substantially all oxygen. Each coil was then removed from the pressure vessel. However, the Sample (7) coil was immediately treated with anaerobic resin after copper ethyl acetoacetate impregnation, while Sample (8) was allowed to age for 7 days before treatment with anaerobic resin. In both cases, no heat was applied to cure.

A third 24 inch, 4.16 kV. coil, Sample (9), wrapped with the same mica splitting tape described above, was impregnated with anaerobic resin and pressurized with oxygen-free nitrogen gas as described above for 16 hours. This comparative Sample (9) coil was not pretreated with a metal complex of a beta keto ester as had been done with Samples (7) and (8). After the 16 hour pressure treatment with nitrogen, the resin on the Sample (9) coil was found to be slightly soft and tacky, and so was placed in an oven and subjected to an additional 3 hour cure at 40° C.

The anaerobic resin, Composition 3, used for coil Samples (7), (8) and (9) consisted of: 800 grams of neopentyl glycol diacrylate; 500 grams of tetraethylene glycol diacrylate; 200 grams of trimethylolpropane triacrylate; 100 grams of pentaerythritol tetracrylate; 200 grams of ethyl methacrylate; 200 grams of cyclohexylmethacrylate; 40 grams of 2,2'-azobis (2-methyl propionitrile) initiator; 30 grams of cumene hydroperoxide initiator; 4 grams of N,N'-diethylformamide accelerator; 4 grams of triphenylamine accelerator; 1 gram of N,N'-dimethyl-p-toluidine accelerator; 0.06 gram of chromium acetylacetonate latent accelerator; 4 grams of benzoic sulfimide coaccelerator; 2 grams of cresylic acid inhibitor; and 0.8 gram of hydroquinone inhibitor. This provided an anaerobic resin having 2,000 grams total of acrylic resin where the weight ratio of polyacrylic resin:monoacrylic resin was 1,600:400 or 10:2.5. The parts additives per 100 parts resin were: 3.5 parts total organic free radical initiator; 0.45 part organic free radical accelerator; 0.20 part organic coaccelerator; 0.24 part free radical stabilizer; and 0.003 part latent accelerator. The viscosity of the resin was about 100 cps. at 25° C.

The cured coils had been measured for resin pickup and drain off, and the results are shown below in Table II:

TABLE II

| Sample | Initial Resin Pick-Up | Resin Run-Off ½ min. drain | Final Resin Pick-Up | Observations 16 hr. N₂ cure |
|---|---|---|---|---|
| (7) CuEA+ Comp. 3 | 46.27 g. | 6.6 g. | 39.6 g. | Resin hard. Completely cured on coil. Very slight odor of acrylate |
| (8) CuEA+ Comp. 3 (aged) | 48.5 g. | 8.2 g. | 40.3 g. | Resin hard. Completely cured on coil. Very slight odor of acrylate. |

TABLE II-continued

| Sample | Initial Resin Pick-Up | Resin Run-Off ½ min. drain | Final Resin Pick-Up | Observations 16 hr. N$_2$ cure |
|---|---|---|---|---|
| *(9) Comp.3 | 40.46 g. | 10.2 g. | 30.2 g. | Resin slightly tacky; coil additionally cured 3 hr. at 40° C. No odor. |

*Comparative Sample: no copper ethylacetoacetate pretreatment.

No leach out of copper ethylacetoacetate into the resin bath was apparent, and the storage stability of the anaerobic resin after the coil pretreatment described above was about 4 months.

The cured coils were also measured for 60 Hz power factors (100 × tan δ) at 25° C. (ASTM designation D150-65T) at applied voltages from 1 kV. to 4 kV., and the results are shown below in Table III:

TABLE III

| Sample | Metal-Beta Keto Ester Aging Time Days | Metal-Beta Keto Ester Complex In Solution | Tan × 1100 (25° C. 60 Hz)** | | | | | |
|---|---|---|---|---|---|---|---|---|
| | | | 1 kV | 1 KV | 2 kV | 2 kV | 4 kV | 4 KV |
| (7) CuEA + Comp. 3 | 0 | 200 mg/liter | 2.5 | 3.9 | 8.6 | 5.3 | 9.2 | 13.3 |
| (8) CuEA + Comp. 3 (aged) | 7 | 200 mg/liter | 2.6 | 3.6 | 6.4 | 6.4 | 10.8 | 10.1 |
| *(9) | 0 | none | 16.9 | 15.0 | 19.3 | 17.0 | 26.0 | 23.0 |

*Comparative Sample: no copper ethylacetoacetate pretreatment.
**Measured on two different "legs" of each coil.

As can be seen from Table II, the copper ethylacetoacetate pretreated coils exhibited greater final resin pickup and less resin runoff: Sample (7) had 14% resin drain and Sample (8) had 17% resin drain while comparative Sample (9) had 25% resin drain. The final result shows a 10 gram increase in resin content of the coil, from about 30 to 40 grams by pretreating the coil with a metal-beta keto ester complex prior to impregnation with the anaerobic resin. The pretreatment process provides a hard cured resin, eliminates heat energy requirements, lowers resin runoff from coils and stators, reduces volatiles thus lowering air pollution, and lowers mechanical and thermal stresses caused by differential expansion between metal and the groundwall resin.

As shown in Table III, dramatic improvement is achieved in power factor values by pretreating the coil with a metal-beta keto ester complex prior to impregnation with the anaerobic resin. The use of a high percentage of diacrylate 1,300 g./2,000 g=65%, as well as use of dual initiators, accelerators and inhibitors, served to help provide the outstanding power factor values of Samples (7) and (8). Use of higher concentration of metal-beta keto ester complexes in the pretreatment step should also lower power factor values.

EXAMPLE 3

A polycarbonate sheet ¼ inch thick was cut into four, 1 inch squares. Two of the pieces, Samples (10) and (11) were surface brushed with a pretreatment solution of copper ethylacetoacetate at a concentration of 20 mg. of copper ethylacetoacetate per liter of acetone solvent. The solvent was allowed to evaporate at room temperature, to give a dry non-tacky film of copper ethylacetoacetate.

An anaerobic resin, Composition 4, was prepared, consisting of: 30 grams of neopentyl glycol diacrylate; 30 grams of epoxylated bisphenol A diacrylate; 20 grams of trimethylol propane triacrylate; 20 grams of cyclohexylmethacrylate; 1.0 gram of 2,2'-azobis (2-methyl propionitrile) initiator; 1.5 grams of cumene hydroperoxide initiator; 0.2 gram of N,N'-diethylformamide accelerator; 0.3 gram of triphenylamine accelerator; 0.3 gram of mercaptobenzothiazole elastomeric accelerator; 0.01 gram of chromium acetylacetonate latent accelerator; 0.2 gram of benzoic sulfimide coaccelerator; and 0.08 gram of hydroquinone inhibitor.

This provided an anaerobic resin having 100 grams total acrylic resin where the weight ratio of polyacrylic resin:monoacrylic resin was 80:10 or 10:1.25. The part additives per 100 parts resin were: 2.5 part total organic free radical initiator; 0.5 part accelerator; 0.2 part organic coaccelerator; 0.08 part free radical stabilizer; and 0.01 part latent accelerator. The viscosity of the resin at 25° C. was about 100 cps.

All four pieces of polycarbonate were brushed with the anaerobic composition. The anaerobic resin was brushed on top of the copper ethylacetoacetate film of Samples (10) and (11). Two composites were made with the polycarbonate pieces by mating the two brushed surfaces together so that Samples (10) and (11) made up one composite, and Samples (12) and (13), which had not been pretreated with copper ethylacetoacetate, made up the second comparative composite. In all cases, the anaerobic resin was disposed between the polycarbonate squares.

A 500 gram weight was placed on each of the three composites. Then, the two composites were placed in a dessicator under a flow of oxygen free nitrogen gas for 16 hours, at a flow rate of 13 liters/minute at 25° C. The adhesive strength between the polycarbonate composites were evaluated by attempting to pry the polycarbonate composites apart. The strongest adhesive bond was formed in the composite which had the polycarbonate surfaces pretreated with the metal-beta keto ester complex, i.e., composite comprising Samples (10) and (11). When the polycarbonate surfaces were finally pried apart, the fracture line of the Sample (10) and (11) composite occurred in the resin between the polycarbonate squares, rather than directly at the resin-polycarbonate interface, indicating that the bond between the anaerobic resin and the polycarbonate surface was extremely strong.

The metal-beta keto ester complex could also be used to form a protective coating on the polycarbonate after cure in nitrogen gas, without adhesive application of a second polycarbonate square.

In the examples above, other inert gases could be used to cure the anaerobic resins and various other formulations of anaerobic resins as well as other metal-beta keto ester complexes utilized in conformity with the specification above with equally outstanding results.

We claim:

1. In the method of anaerobically curing a resin comprising acrylic resin, the improvement comprising externally catalyzing the cure with a composition consisting essentially of a metal-beta keto ester complex having the structural formula:

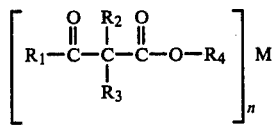

where M is a transition metal; $R_1$ is selected from the group consisting of alkyl groups having from 1 to 20 carbon atoms, benzene, naphthalene, anthracene, and hydrocarbon substituted aromatic; $R_2$ and $R_3$ are selected from hydrogen, alkyl groups having from 1 to 20 carbon atoms, benzene, naphthalene, anthracene and hydrocarbon substituted aromatic; $R_4$ is selected from alkyl groups having from 1 to 20 carbon atoms; and n is equal to the valence of the metal M.

2. The method of claim 1, where, m is copper, and as a final step, the anaerobic resin is cured by contact with an oxygen free inert gas.

3. A method of curing an anaerobic resin, comprising the steps of: (1) applying a composition consisting essentially of a metal-beta keto ester complex to a surface of an article, and (2) applying an anaerobic resin comprising acrylic resin to said surface to contact said metal-beta keto ester complex, where the metal-beta keto ester complex has the structural formula:

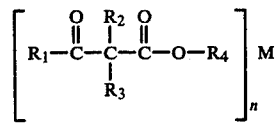

where M is a transition metal; $R_1$ is selected from the group consisting of alkyl groups having from 1 to 20 carbon atoms, benzene, naphthalene, anthracene, and hydrocarbon substituted aromatic; $R_2$ and $R_3$ are selected from hydrogen, alkyl groups having from 1 to 20 carbon atoms, benzene, naphthalene, anthracene and hydrocarbon substituted aromatic; $R_4$ is selected from alkyl groups having from 1 to 20 carbon atoms; and n is equal to the valence of the metal M.

4. The method of claim 3, wherein the article is a substrate selected from the group consisting of mica, mica tape, resin impregnated mica tape, plastic, metal, glass, wood, cloth, resin impregnated cloth, glass cloth, paper, and resin impregnated paper.

5. The method of claim 3, where the composition impregnates the surface of the article.

6. The method of claim 3, where the composition forms a film on the surface of the article.

7. The method of claim 3, where the composition containing the metal-beta keto ester complex is a resin containing the metal-beta keto ester and the article is a tape.

8. The method of claim 3, where the anaerobic resin comprises an admixture of (acrylic resin):(aromatic reactive vinyl monomer):(epoxy resin): (anhydride) in a weight ratio of from about (10):(0 to 120):(0 to 100):(0to 60), said resin also containing small effective amounts of initiators, accelerators, latent accelerators, and stabilizers, and M is copper.

9. The method of claim 3, where the composition containing the metal-beta keto ester complex is a solvent solution of a transition metal alkylacetoacetate, and the article is a resin impregnated tape.

10. The method of claim 3, where the composition containing the metal-beta keto ester complex is a solvent solution of copper ethylacetoacetate, where $R_4$ is $C_2H_5$, and the $R_4$ component of the complex is an electron donor to oxygen in the complex.

11. The method of claim 3, where, as a final step, the anaerobic resin is cured by contact with an oxygen free inert gas.

12. The method of claim 3, where, as a final step, the anaerobic resin is cured by contact with an oxygen free inert gas selected from the group consisting of argon, helium, carbon dioxide, methane, hydrogen, and nitrogen, where said gas contact is effective to displace oxygen present, in the anaerobic resin.

13. The method of claim 3 where the article is a plastic.

14. The method of claim 13, where a second plastic article is placed on top of the applied anaerobic resin to form a plastic composite.

15. The method of claim 9, where the resin impregnated tape is wrapped around an electrical coil.

16. The method of claim 7, where the tape is wrapped around an electrical coil, and the tape is a mica tape.

17. A method of curing an anaerobic resin, comprising the steps of:
(1) applying a composition consisting essentially of a transition metal alkylacetoacetate to the outside surface of a mica tape,
(2) applying an anaerobic resin comprising acrylic resin to said mica tape to contact said transition metal alkylacetoacetate, and
(3) curing the anaerobic resin by contact with an oxygen free inert gas.

18. The method of claim 17, where the mica tape is wrapped around an electrical coil before curing, and the metal alkylacetoacetate is copper ethylacetoacetate.

19. A method of curing an anaerobic resin, comprising the steps of:
(1) supplying a mica tape having a resinous bonding composition contained therein, said bonding composition consisting essentially of a resin and a transition metal alkylacetoacetate,
(2) wrapping the mica tape around an electrical conductor,
(3) applying an anaerobic resin comprising acrylic resin to said mica tape to contact said transition metal alkylacetoacetate, and
(4) curing the anaerobic resin by contact with an oxygen free inert gas.

20. The method of claim 19, where the transition metal alkylacetoacetate is copper ethylacetoacetate, and the electrical conductor is an electrical coil.

21. A method of curing an anaerobic resin comprising the steps of:

(1) applying a composition consisting essentially of a transition metal alkylacetoacetate to an outside surface of a plastic article, (2) applying an anaerobic resin comprising acrylic resin to said outside surface to contact said transition metal alkylacetoacetate, and (3) curing the anaerobic resin by contact with an oxygen free inert gas.

22. The method of claim 21, where the transition metal alkylacetoacetate is copper ethylacetoacetate and the plastic is polycarbonate.

23. The method of claim 1, where the metal-beta keto ester complex is copper ethylacetoacetate, where $R_4$ is $C_2H_5$, and the $R_4$ component of the complex is an electron donor to oxygen in the complex.

24. The method according to claim 17, or claim 19, or claim 21, where the metal alkylacetoacetate has the structural formula:

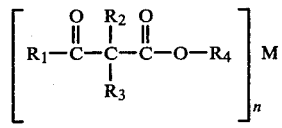

where M is a transition metal; $R_1$ is selected from the group consisting of alkyl groups having from 1 to 20 carbon atoms, benzene, naphthalene, anthracene, and hydrocarbon substituted aromatic; $R_2$ and $R_3$ are selected from hydrogen, alkyl groups having from 1 to 20 carbon atoms, benzene, naphthalene, anthracene and hydrocarbon substituted aromatic; $R_4$ is selected from alkyl groups having from 1 to 20 carbon atoms; n is equal to the valence of the metal M, and the —$R_4$ component is an electron donor to oxygen.

* * * * *